(12) United States Patent
Kuribayashi et al.

(10) Patent No.: US 9,303,147 B2
(45) Date of Patent: Apr. 5, 2016

(54) ULTRAVIOLET RAY CURABLE INK COMPOSITION FOR USE IN INK JET METHOD AND RECORDED OBJECT

(71) Applicant: SEIKO EPSON CORPORATION, Tokyo (JP)

(72) Inventors: Homare Kuribayashi, Matsumoto (JP); Naoyuki Toyoda, Suwa (JP); Tomohiro Ogawa, Okaya (JP); Masaya Shibatani, Matsumoto (JP); Koki Hirata, Matsumoto (JP); Masaru Terada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/955,977

(22) Filed: Jul. 31, 2013

(65) Prior Publication Data
US 2014/0037918 A1 Feb. 6, 2014

(30) Foreign Application Priority Data

Aug. 2, 2012 (JP) .................................. 2012-172277

(51) Int. Cl.
| | | |
|---|---|---|
| *C08K 5/3435* | (2006.01) | |
| *C08K 3/08* | (2006.01) | |
| *C08K 5/5337* | (2006.01) | |
| *C09D 11/101* | (2014.01) | |
| *C08K 5/52* | (2006.01) | |
| *C09D 11/322* | (2014.01) | |

(52) U.S. Cl.
CPC ................ *C08K 5/52* (2013.01); *C09D 11/101* (2013.01); *C09D 11/322* (2013.01); *Y10T 428/24901* (2015.01)

(58) Field of Classification Search
None
See application file for complete search history.

(56) References Cited

U.S. PATENT DOCUMENTS

| | | | |
|---|---|---|---|
| 6,340,723 | B1 | 1/2002 | Nitta et al. |
| 6,808,271 | B1 | 10/2004 | Kurematsu |
| 2002/0096087 | A1 | 7/2002 | Glausch |
| 2003/0199655 | A1 | 10/2003 | Yurugi et al. |
| 2004/0214945 | A1 | 10/2004 | Uozumi |
| 2006/0000389 | A1 | 1/2006 | Duguet et al. |
| 2006/0063004 | A1 | 3/2006 | Takano et al. |
| 2008/0081124 | A1 | 4/2008 | Sano et al. |
| 2008/0081864 | A1 | 4/2008 | Takano |
| 2008/0216706 | A1 | 9/2008 | Ikeya et al. |
| 2009/0075036 | A1 | 3/2009 | Itano et al. |
| 2009/0110827 | A1 | 4/2009 | Nakano et al. |
| 2009/0208651 | A1 | 8/2009 | Oyanagi et al. |
| 2009/0220695 | A1 | 9/2009 | Oyanagi et al. |
| 2009/0280302 | A1 | 11/2009 | Fukumoto et al. |
| 2010/0026751 | A1 | 2/2010 | Oyanagi |
| 2010/0075119 | A1 | 3/2010 | Ohnishi |
| 2010/0215921 | A1* | 8/2010 | Kagose ...................... 428/195.1 |
| 2010/0279083 | A1 | 11/2010 | Trummer et al. |
| 2010/0330296 | A1 | 12/2010 | Loccufier et al. |
| 2011/0008613 | A1 | 1/2011 | Takano et al. |
| 2011/0014440 | A1 | 1/2011 | Itano et al. |
| 2012/0295076 | A1* | 11/2012 | Toyoda et al. ............ 428/195.1 |
| 2012/0295082 | A1* | 11/2012 | Toyoda et al. .............. 428/208 |
| 2013/0088553 | A1 | 4/2013 | Maennig et al. |
| 2013/0196125 | A1 | 8/2013 | Toyoda et al. |
| 2013/0196126 | A1 | 8/2013 | Toyoda et al. |

FOREIGN PATENT DOCUMENTS

| | | |
|---|---|---|
| EP | 0633297 | 7/1994 |
| EP | 1739137 | 1/2007 |
| EP | 2083052 | 7/2009 |
| EP | 2623570 | 8/2013 |
| EP | 2631080 | 8/2013 |
| JP | 58-168663 | 10/1983 |
| JP | 59-172140 | 9/1984 |
| JP | 06-192610 | 7/1994 |
| JP | 09-059701 | 3/1997 |
| JP | 10-219150 | 8/1998 |
| JP | 2001-108937 | 10/1999 |
| JP | 2001-106937 | 4/2001 |
| JP | 2001-164150 | 6/2001 |
| JP | 2001-192618 | 7/2001 |
| JP | 2002-194247 | 7/2002 |
| JP | 2003-012964 | 1/2003 |
| JP | 2005-272568 | 10/2005 |
| JP | 2006-501345 | 1/2006 |
| JP | 2006-169393 | 6/2006 |
| JP | 2008-088228 | 4/2008 |
| JP | 2009-57548 | 3/2009 |
| JP | 2009-091550 | 4/2009 |
| JP | 2009-215411 | 9/2009 |
| JP | 2010-018730 | 1/2010 |
| JP | 2010-030139 | 2/2010 |
| JP | 2010-077228 | 4/2010 |
| JP | 2010-242037 | 10/2010 |
| JP | 2011-012253 | 1/2011 |
| JP | 2011-046115 | 3/2011 |
| JP | 2011-508030 | 3/2011 |
| JP | 2011-137083 | 7/2011 |
| JP | 2012-102295 | 5/2012 |
| WO | 2004-031304 | 4/2004 |
| WO | 2005-007755 | 1/2005 |
| WO | 2006-063004 | 1/2007 |
| WO | 2008/081864 | 7/2008 |
| WO | 2011-080973 | 7/2011 |

* cited by examiner

OTHER PUBLICATIONS

Extended European Search Report dated Oct. 28, 2013 for European Patent Application 13178821.8.

*Primary Examiner* — Vu A Nguyen
(74) *Attorney, Agent, or Firm* — Workman Nydegger

(57) ABSTRACT

An ultraviolet ray curable ink composition is provided. The ultraviolet ray curable ink composition contains a polymerizable compound; and an aluminum pigment subjected to a surface treatment with a phosphate compound. The aluminum pigment subjected to the surface treatment with the phosphate compound is subjected to an X-ray photoelectron spectrometer to obtain an X-ray photoelectron spectrum having a wave form. Thereafter, when a waveform separation was performed by using a Voigt function in such an X-ray photoelectron spectrum, the X-ray photoelectron spectrum has peaks in the rage of 190 eV or more but 192 eV or less. A printed object is also provided. The printed object is produced by applying the ultraviolet ray curable ink composition onto a recording medium, and then irradiating the ultraviolet ray curable ink composition with an ultraviolet ray.

13 Claims, No Drawings

ULTRAVIOLET RAY CURABLE INK COMPOSITION FOR USE IN INK JET METHOD AND RECORDED OBJECT

CROSS-REFERENCE TO RELATED APPLICATION

This application is based on and claims a priority from a Japanese Patent Application No. 2012-172277 filed on Aug. 2, 2012, which are hereby expressly incorporated by reference herein in the entirety.

BACKGROUND

1. Technical Field

The present invention relates to an ultraviolet ray curable ink composition for use in an ink jet method (hereinafter, simply referred to as "ultraviolet ray curable ink composition") and a printed object.

2. Related Art

Conventionally, as a method of manufacturing a trinket showing an appearance having gloss, used is a metal plating, a metal foil press printing using a metal foil, a thermal transfer using a metal foil or the like.

However, there are problems in that a fine pattern is hardly to be formed by using such methods or such methods are difficult to be used for a curved surface portion. Furthermore, the metal foil press printing is difficult to achieve on-demand printing, so that there are problems as follows: It is difficult to supply various kinds of print materials. It is difficult to form metal-texture printing having gradation.

On the other hand, as a method of recording a composition containing a pigment or a dye onto a recording medium, used is a method of recording the composition using an ink jet method. The ink jet method has such advantages as to be able to form the fine pattern or to be used for the curved surface portion. Further, in order to further improve wear resistance, water resistance, solvent resistance and the like of a printed portion, recently, a composition (ultraviolet ray curable ink composition), which includes a polymerizable compound and can be cured due to ultraviolet ray irradiation, is used in the ink jet method (for example, Patent document 1).

However, in the case where metal particles of metal powder are used instead of the pigment or the dye in the ultraviolet ray curable ink composition, there is a problem in that it is difficult to sufficiently exhibit properties such as gloss provided inherently by the metal. In addition, stability (storage stability) of the composition is lowered. This causes a problem in that the composition is turned into a gel, and thus ejection stability of the composition is lowered due to viscosity increase thereof.

Patent document 1: JP-A 2009-57548

SUMMARY

Accordingly, it is an object of the present invention to provide an ultraviolet ray curable ink composition which has excellent storage stability and ejection stability, and can be reliably used for producing a pattern (printed portion) having high gloss. Furthermore, it is another object of the present invention to provide a printed object having such a pattern having high gloss produced by using the ultraviolet ray curable ink composition.

These objects are achieved by the present inventions described below.

An ultraviolet ray curable ink composition adapted to be ejected by using an ink jet method, comprising:
a polymerizable compound; and an aluminum pigment subjected to a surface treatment with a phosphate compound, the aluminum pigment having particles,
wherein the aluminum pigment subjected to the surface treatment with the phosphate compound is subjected to an X-ray photoelectron spectrometer to obtain an X-ray photoelectron spectrum having a wave form, and then when a waveform separation was performed by using a Voigt function in such an X-ray photoelectron spectrum, the X-ray photoelectron spectrum has peaks in the rage of 190 eV or more but 192 eV or less.

This makes it possible to provide an ultraviolet ray curable ink composition which has excellent storage stability and ejection stability, and can be reliably used for producing a pattern (printed portion) having high gloss.

In the ultraviolet ray curable ink composition of the invention, it is preferred that the phosphate compound has a chemical structure represented by the following formula (1):

$$POR_n(OH)_{3-n} \quad (1)$$

where in the above formula (1), "R" is $CH_3(CH_2)_m-$, $CH_3(CH_2)_m(CH_2O)_1-$, $CH_3(CH_2)_m(CH_2CH_2O)_1-$ or $CH_3(CH_2)_mO-$, "n" is an integral number in the range of 1 or more but 3 or less, "m" is an integral number in the range of 2 or more but 18 or less, and "1" is an integral number in the range of 1 or more but 18 or less.

This makes it possible to especially improve the storage stability of the ultraviolet ray curable ink composition. Furthermore, it is possible to especially improve the gloss and wear resistance of the printed portion of the printed object to be produced by using the ultraviolet ray curable ink composition.

In the ultraviolet ray curable ink composition of the invention, it is also preferred that the phosphate compound has a chemical structure represented by the following formula (2):

$$POR_n(OH)_{3-n} \quad (2)$$

where in the above formula (2), "R" is $CF_3(CF_2)_m-$, $CF_3(CF_2)_m(CH_2)_1-$, $CF_3(CF_2)_m(CH_2O)_1-$, $CF_3(CF_2)_m(CH_2CH_2O)_1-$, $CF_3(CF_2)_mO-$ or $CF_3(CF_2)_m(CH_2)_lO-$, "n" is an integral number in the range of 1 or more but 3 or less, "m" is an integral number in the range of 2 or more but 18 or less, and "1" is an integral number in the range of 1 or more but 18 or less.

This makes it possible to especially improve the storage stability of the ultraviolet ray curable ink composition. Furthermore, it is possible to especially improve the gloss and the wear resistance of the printed portion of the printed object to be produced by using the ultraviolet ray curable ink composition.

In the ultraviolet ray curable ink composition of the invention, it is also preferred that the phosphate compound has a perfluoro alkyl structure.

This makes it possible to especially improve the storage stability of the ultraviolet ray curable ink composition. Furthermore, it is possible to especially improve the gloss and the wear resistance of the printed portion of the printed object to be produced by using the ultraviolet ray curable ink composition.

In the ultraviolet ray curable ink composition of the invention, it is also preferred that each of the particles of the aluminum pigment is formed into a scaly shape.

This makes it possible to dispose particles of an aluminum pigment on a recording medium to supply the ultraviolet ray curable ink composition so that a major surface of each particle of the aluminum pigment are oriented along a shape of surface of the recording medium. Since it is possible to exhibit the gloss provided inherently by aluminum in an obtained printed object efficiently, it is possible to especially improve the gloss and high-grade sense of the produced pattern (printed portion). In addition, it is possible to especially improve the wear resistance of the printed object.

In the ultraviolet ray curable ink composition of the invention, it is also preferred that an average thickness of the particles of the aluminum pigment is in the range of 10 nm or more but 100 nm or less.

This makes it possible to further improve the gloss and the high-grade sense of the printed object to be produced by using the ultraviolet ray curable ink composition. Furthermore, it is possible to further improve the storage stability and the ejection stability of the ultraviolet ray curable ink composition.

In the ultraviolet ray curable ink composition of the invention, it is also preferred that an average particle size in 50% of the particles of the aluminum pigment is in the range of 0.5 μm or more but 3.0 μm or less, and a maximum particle size of the particles of the aluminum pigment is 5.0 μm or less.

This makes it possible to further improve the gloss and the high-grade sense of the printed object to be produced by using the ultraviolet ray curable ink composition. Furthermore, it is possible to further improve the storage stability and the ejection stability of the ultraviolet ray curable ink composition.

In the ultraviolet ray curable ink composition of the invention, it is also preferred that the ultraviolet ray curable ink composition as described above further comprises a dispersant having a basic property and a polymer structure.

This makes it possible to especially improve the storage stability and the ejection stability of the ultraviolet ray curable ink composition. Furthermore, it is possible to further improve the gloss and the wear resistance of the printed portion to be produced by using the ultraviolet ray curable ink composition.

In the ultraviolet ray curable ink composition of the invention, it is also preferred that the polymerizable compound contains phenoxy ethyl acrylate.

In this case, it is possible to especially improve the storage stability and the ejection stability of the ultraviolet ray curable ink composition, and to make reactivity of the ultraviolet ray curable ink composition ejected by the ink jet method more excellent. This makes it possible to further improve productivity of the printed object and the wear resistance and the like of the pattern to be formed.

In the ultraviolet ray curable ink composition of the invention, it is also preferred that the polymerizable compound contains at least one selected from the group consisting of ethyl 2-(2-hydroxy ethoxy)acrylate, dipropylene glycol diacrylate, tripropylene glycol diacrylate, 2-hydroxy 3-phenoxypropyl acrylate and 4-hydroxy butyl acrylate in addition to the phenoxy ethyl acrylate.

In this case, it is possible to especially improve the storage stability and the ejection stability of the ultraviolet ray curable ink composition, and to make the reactivity of the ultraviolet ray curable ink composition ejected by the ink jet method more excellent. This makes it possible to further improve the productivity of the printed object and the wear resistance and the like of the pattern to be formed.

In the ultraviolet ray curable ink composition of the invention, it is also preferred that the polymerizable compound contains at least one selected from the group consisting of dimethylol tricyclodecane diacrylate, dimethylol dicyclopentane diacrylate, dicyclopentenyl acrylate, dicyclopentanyl acrylate, isobornyl acrylate, acryloyl morpholine, tetrahydrofurfuryl acrylate, ethylcarbitol acrylate and methoxy triethylene glycol acrylate.

This makes it possible to further improve the storage stability and the ejection stability of the ultraviolet ray curable ink composition and the wear resistance and the like of the pattern to be formed.

In the ultraviolet ray curable ink composition of the invention, it is also preferred that the ultraviolet ray curable ink composition as described above further comprises a substance A having a partial structure represented by the following formula (5),

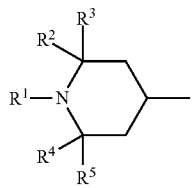

(5)

where in the formula (5), $R^2$ is a hydrogen atom, an oxygen radical, a hydrocarbon group or an alkoxy group, and each of $R^2$, $R^3$, $R^4$ and $R^5$ is independently a hydrogen atom or a hydrocarbon group.

This makes it possible to further improve the storage stability and curing property of the ultraviolet ray curable ink composition. Furthermore, it is possible to effectively exhibit the gloss and the high-grade sense provided inherently by aluminum in the printed object to be produced by using the ultraviolet ray curable ink composition, so that it is possible to especially improve the gloss and the wear resistance of the printed portion. Consequently, it is possible to especially improve durability of the printed object.

In the ultraviolet ray curable ink composition of the invention, it is also preferred that an amount of the substance A is defined as $X_A$ [mass %] and an amount of the aluminum pigment is defined as $X_M$ [mass %], $X_A$ and $X_M$ satisfy a relationship of $0.01 \leq X_A/X_M \leq 0.8$.

This makes it possible to especially improve the storage stability and the ejection stability of the ultraviolet ray curable ink composition. Furthermore, it is possible to further improve the gloss and the wear resistance of the printed portion to be produced by using the ultraviolet ray curable ink composition.

A printed object of the present invention is produced by applying the ultraviolet ray curable ink composition as described above onto a recording medium, and then irradiating the ultraviolet ray curable ink composition with an ultraviolet ray.

This makes it possible to provide the printed object including the pattern having excellent gloss.

DESCRIPTION OF EXEMPLARY EMBODIMENT

Hereinbelow, preferred embodiments of the invention will be described in detail.

Ultraviolet Ray Curable Ink Composition

First, an ultraviolet ray curable ink composition for use in an ink jet method of the invention will be described.

The ultraviolet ray curable ink composition for use in the ink jet method (hereinafter, simply referred to as "ultraviolet ray curable ink composition") of the invention is adapted to be ejected using the ink jet method and includes a polymerizable compound which is polymerized by irradiating an ultraviolet ray.

Meanwhile, conventionally, as a method of manufacturing a trinket showing an appearance having gloss, used is a metal plating, a metal foil press printing using a metal foil, a thermal transfer using a metal foil or the like.

However, there are problems in that a fine pattern is hardly to be formed by using such methods or such methods are difficult to be used with respect to a curved surface portion. Further, there is also a problem in that the use of the metal foil press printing cannot form a metal-texture printing having a gradation.

On the other hand, as a method of recording a composition containing a pigment or a dye onto a recording medium, used is a method of recording the composition using an ink jet method. The ink jet method has such advantages as to be able to form the fine pattern or to be used with respect to the curved surface portion. Further, in order to further improve wear resistance, water resistance, solvent resistance and the like of a printed portion, recently, a composition (ultraviolet ray curable ink composition), which includes a polymerizable compound and can be cured due to ultraviolet ray irradiation, is used in the ink jet method.

However, in the case where metal particles of metal powder are used instead of the pigment or the dye in the ultraviolet ray curable ink composition, there is a problem in that it is difficult to sufficiently exhibit properties such as gloss provided inherently by the metal. In addition, stability (storage stability) of the composition is lowered. This causes a problem in that the composition is tuned into a gel, and thus ejection stability and the like of the composition is lowered due to viscosity increase thereof.

Accordingly, the present inventors have earnestly conducted studies for purpose of solving the above problems. As a result, they have found the invention. In other words, the ultraviolet ray curable ink composition of the invention contains a polymerizable compound and an aluminum pigment which has been subjected to a surface treatment with a phosphate compound. Such an aluminum pigment is subjected to an X-ray photoelectron spectrometer to obtain an X-ray photoelectron spectrum having a wave form. Then, when a waveform separation is performed by using a Voigt function in such an X-ray photoelectron spectrum, the X-ray photoelectron spectrum has peaks in the rage of 190 eV or more but 192 eV or less. This makes it possible to improve chemical stability and dispersion stability of the aluminum pigment in the ultraviolet ray curable ink composition and make the storage stability and the ejection stability for a long period of time of the ultraviolet ray curable ink composition excellent. Further, in a printed object produced by using the ultraviolet ray curable ink composition, it is possible to reliably arrange the aluminum pigment at the vicinity of an outer surface of a printed portion, so that to efficiently exhibit characteristics such as gloss which are inherently provided by the aluminum pigment. Further, even if a polymerizable compound having low surface tension is used as a constituent material of the ultraviolet ray curable ink composition, it is possible to reliably arrange (leafing) the aluminum pigment at the vicinity of the outer surface of the printed portion in the printed object produced by using the ultraviolet ray curable ink composition. Furthermore, it is possible to efficiently exhibit the characteristics such as the gloss which are inherently provided by the aluminum pigment. Therefore, it is possible to broaden options of the polymerizable compound, and easily adjust the characteristics of the ultraviolet ray curable ink composition and the characteristics of the printed object produced by using the ultraviolet ray curable ink composition (e.g. viscosity, storage stability and ejection stability of the ultraviolet ray curable ink composition and wear resistance of the printed object) without loss of the gloss which is inherently provided by the aluminum pigment.

Aluminum Pigment

As described above, the ultraviolet ray curable ink composition of the invention contains the aluminum pigment which has been subjected to the surface treatment with the phosphate compound.

In the invention, such an aluminum pigment, which has been subjected to the surface treatment with the phosphate compound, is subjected to the X-ray photoelectron spectrometer to obtain the X-ray photoelectron spectrum having the wave form. Then, when the waveform separation is performed by using the Voigt function in such an X-ray photoelectron spectrum, the X-ray photoelectron spectrum has the peaks in the rage of 190 eV or more but 192 eV or less.

By bonding the phosphate compound to a surface of each of particles of the aluminum pigment, a peak derived from P (phosphorus) is chemical-shifted between 190 eV or more but 192 eV or less in the X-ray photoelectron spectrum. The existence of the peak in the range of 190 eV or more but 192 eV or less means that the phosphate compound is reliably bonded to the surface of the particle of the aluminum pigment. This makes it possible to improve the chemical stability and the dispersion stability of the aluminum pigment in the ultraviolet ray curable ink composition and make the storage stability and the ejection stability for a long period of time of the ultraviolet ray curable ink composition excellent. Further, in the printed object produced by using the ultraviolet ray curable ink composition, it is possible to reliably arrange the aluminum pigment at the vicinity of the outer surface of the printed portion, so that to efficiently exhibit the characteristics such as the gloss which are inherently provided by the aluminum pigment.

Base Particles

First, base particles for constituting the aluminum pigment (that is, aluminum metal particles to be subjected to the surface treatment with the phosphate compound) will be described.

Each of the base particles for constituting the aluminum pigment has only to be constituted from aluminum at an area including at least the vicinity of a surface thereof, but, for example, the entirety of each of the base particles may be formed from the aluminum, or each of the base particles may include a film which is constituted of a base portion formed from a non-metal material and aluminum covering the base portion.

Aluminum (Al) originally shows especially excellent gloss among various kinds of metal materials. However, in the case where particles formed from Al are used in the ultraviolet ray curable ink composition, the present inventors have found that the storage stability of the ultraviolet ray curable ink composition becomes lower to be tuned into a gel, and therefore the problems such as lowering of the ejection stability of the ultraviolet ray curable ink composition due to viscosity increase thereof occur more remarkably. In contrast, the invention reliably prevents the occurrence of the above problems even in the case where the particles of the aluminum pigment are used. In other words, in the invention, the aluminum pigment constituting the ultraviolet ray curable ink composition is subjected to the surface treatment with the phosphate compound and the X-ray photoelectron spectrum has the peaks as described above. By doing so, the above problems can be solved.

Further, the base particles may be produced using any methods. However, it is preferred that they are produced by forming a film made of Al using a vapor phase film formation method, and then crushing the film. This makes it possible to more effectively express the gloss and the like which is provided inherently by Al in the pattern (printed portion) to be formed using the ultraviolet ray curable ink composition of the invention. Furthermore, this also makes it possible to suppress variation in property among the particles. Furthermore, by using such a method, it is possible to appropriately produce the aluminum pigment including the particles having a relatively thin thickness.

In the case where the base particles are produced using such a method, for example, by forming (film-forming) the film made of Al onto a base material, it is possible to appropriately produce the base particles. As the base material, for example, a film made of a plastic material such as polyethylene terephthalate can be used. Further, the base material may have a release agent layer provided on a film-formation surface thereof.

Furthermore, it is preferred that the crushing is carried out by subjecting the film to ultrasonic vibration in a liquid. This makes it possible to easily and reliably obtain the base particles having above particle sizes and to suppress variation of the particles in a size, a shape and a property from occurring.

In the case where the crushing is carried out in the above method, as the above mentioned liquid, it is preferable to use: alcohols such as methanol, ethanol, propanol and butanol; hydrocarbon-based compounds such as n-heptane, n-octane, decane, dodecane, tetradecane, toluene, xylene, cymene, durene, indene, dipentene, tetrahydro naphthalene, decahydro naphthalene and cyclohexyl benzene; ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxy ethane, bis(2-methoxy ethyl) ether and p-dioxane; polar compounds such as propylene carbonate, γ-butyrolactone, N-methyl-2-pyrolidone, N,N-dimethyl formamide (DMF), N,N-dimethyl acetamide (DMA), dimethyl sulfoxide, cyclohexanone and acetonitrile; and the like. By using such a liquid, it is possible to prevent undesirable oxidation and the like of the base particles and to further improve productivity of the base particles and the aluminum pigment. Further, it is also possible to make the variation of the particles in the size, the shape and the property smaller.

Phosphate Compound

The base particles described above are subjected to the surface treatment with the phosphate compound.

The phosphate compound is not limited to a specific compound, but is preferably at least one selected from the group consisting of an alkyl phosphate and a fluorine-based phosphate. This makes it possible to further improve the storage stability and the ejection stability of the ultraviolet ray curable ink composition.

Hereinafter, description will be made on each compound.

Alkyl Phosphate

The alkyl phosphate has a structure in which at least a part of OH groups included in phosphoric acid is esterized with a function group including an alkyl group ($C_nH_{2n+1}$— ("n" is an integer number of 1 or more)).

It is preferred that the alkyl phosphate is constituted of only elements of carbon (C), hydrogen (H), phosphorus (P) and oxygen (O). This makes it possible to especially improve the dispersibility of the aluminum pigment to a dispersion medium, thereby enabling a dispersion state of the aluminum pigment to maintain without use of a dispersant.

In particular, it is preferred that the alkyl phosphate has a chemical structure represented by the following formula (1).

$$POR_n(OH)_{3-n} \qquad (1)$$

where in the above formula (1), "R" is $CH_3(CH_2)_m$—, $CH_3(CH_2)_m(CH_2O)_l$—, $CH_3(CH_2)_m(CH_2CH_2O)_l$— or $CH_3(CH_2)_mO$—, "n" is an integral number of 1 or more but 3 or less, "m" is an integral number of 2 or more but 18 or less, and "l" is an integral number of 1 or more but 18 or less.

This makes it possible to especially improve the storage stability of the ultraviolet ray curable ink composition, and to make the gloss and the wear resistance of the printed portion of the printed object produced using the ultraviolet ray curable ink composition especially excellent.

In the above formula (1), "m" is preferably the integral number of 3 or more but 14 or less, and more preferably the integral number of 4 or more but 12 or less. This makes it possible to more remarkably exhibit the above mentioned effects.

Further, in the above formula (1), "l" is preferably the integral number of 1 or more but 14 or less, and more preferably the integral number of 1 or more but 10 or less. This makes it possible to more remarkably exhibit the above mentioned effects.

Concrete examples of the alkyl phosphate include $C_{14}H_{29}(O)P(OCH_2CH_3)_2$, $C_{16}H_{33}(O)P(OCH_2CH_3)_2$, $C_{18}H_{37}(O)P(OH)_2$, $C_{18}F_{37}(O)P(OH)(OCH_2CH_3)$, $C_{12}H_{25}(O)P(OCH_2CH_3)_2$, $C_{12}H_{25}(O)P(OCH_2CH_3)_2$, and the like.

The base particles may be directly subjected to the surface treatment with the alkyl phosphate as described above, but may be preferably subjected to a treatment with an acid or a base, and then the subjected base particles may be preferably subjected to a treatment with the alkyl phosphate. This makes it possible to reliably modify the surfaces of the base particles with the alkyl phosphate due to a chemical bonding thereof, to thereby exhibit the above mentioned effects of the invention in a more effective manner. Further, even if an oxide film is formed on the surfaces of particles to become the base particles (base material) before the base particles are subjected to the surface treatment with the alkyl phosphate, it is possible to reliably remove the oxide film. Furthermore, it is possible to be subjected to the surface treatment with the alkyl phosphate in a state that the oxide film is removed. Therefore, it is possible to especially improve the gloss of the aluminum pigment to be produced. Examples of the acid include a proton acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, hypophosphorous acid and the like. Among them, it is preferably hydrochloric acid, phosphoric acid and acetic acid. On the other hand, examples of the base include sodium hydroxide, potassium hydroxide, calcium hydroxide and the like. Among them, it is preferably sodium hydroxide and potassium hydroxide.

Fluorine-Based Phosphate

As the fluorine-based phosphate, a phosphate having at least one fluorine atom in a molecule thereof can be used.

In particular, as the fluorine-based phosphate, a compound having a chemical structure represented by the following formula (2) is preferable.

$$POR_n(OH)_{3-n} \qquad (2)$$

where in the above formula (2), "R" is $CF_3(CF_2)_m$—, $CF_3(CF_2)_m(CH_2)_l$—, $CF_3(CF_2)_m(CH_2O)_l$—, $CF_3(CF_2)_m$ $(CH_2CH_2O)_l$—, $CF_3(CF_2)_mO$— or $CF_3(CF_2)_m(CH_2)_lO$—, "n" is an integral number of 1 or more but 3 or less, "m" is an integral number of 2 or more but 18 or less, and "l" is an integral number of 1 or more but 18 or less.

This makes it possible to especially improve the storage stability of the ultraviolet ray curable ink composition, and to make the gloss and the wear resistance of the printed portion of the printed object produced using the ultraviolet ray curable ink composition especially excellent.

In the above formula (2), "m" is preferably the integral number of 3 or more but 14 or less, and more preferably the integral number of 4 or more but 12 or less. This makes it possible to more remarkably exhibit the above mentioned effects.

Further, in the above formula (2), "l" is preferably the integral number of 1 or more but 14 or less, and more preferably the integral number of 1 or more but 10 or less. This makes it possible to more remarkably exhibit the above mentioned effects.

Further, it is preferred that the fluorine-based phosphate has a perfluoro alkyl structure ($C_nF_{2n+1}$). This makes it possible to further improve the storage stability of the ultraviolet ray curable ink composition, and to make the gloss and the wear resistance of the printed portion of the printed object produced using the ultraviolet ray curable ink composition more excellent.

The base particles may be directly treated with the above fluorine-based phosphate, but may be preferably treated with an acid or a base, and then treated with the above fluorine-based phosphate. This makes it possible to reliably modify the surfaces of the base particles with the above fluorine-based phosphate due to a chemical bonding thereof, to thereby exhibit the above mentioned effects of the invention in a more effective manner. Examples of the acid include a proton acid such as hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, hypophosphorous acid and the like. Among them, it is preferably hydrochloric acid, phosphoric acid and acetic acid. On the other hand, examples of the base include sodium hydroxide, potassium hydroxide, calcium hydroxide and the like. Among them, it is preferably sodium hydroxide and potassium hydroxide.

Each particle of the aluminum pigment (base particles) may be of any shape such as a spherical shape, a fusiform shape or a needle shape, but is preferably of a scaly shape. This makes it possible to arrange the particle of the aluminum pigment on a recording medium, on which the ultraviolet ray curable ink composition is to be applied, so that a major surface of the particle of the aluminum pigment are oriented along a surface shape of the recording medium. Therefore, it is also possible to more effectively exhibit the gloss and the like provided inherently by aluminum in the printed object to be produced, to thereby make the gloss and the high-grade sense of the pattern (printed portion) to be formed especially excellent. Further, in the case where the major surface of the particle of the aluminum pigment is oriented along the surface shape of the recording medium, it is also possible to further improve the water resistance of the printed portion. Furthermore, in the case where the aluminum pigment is not subjected to the above mentioned surface treatment with the phosphate compound, if each of the particles of the aluminum pigment is of the scaly shape, the storage stability and the ejection stability of the ultraviolet ray curable ink composition are apt to be further remarkably lowered. In contrast, in the invention, even if each of the particles of the aluminum pigment is of the scaly shape, it is possible to prevent such a problem from occurring reliably. In other words, in the case where each of the particles of the aluminum pigment is of the scaly shape, the effects of the invention can be more remarkably exhibited.

In the invention, the scaly shape means a shape in which an area of the particle observed from a predetermined direction (that is, an area of each particle at a planar view thereof) is larger than an area of the particle observed from a direction orthogonal to the above observation direction, such as a plate shape or a curved plate shape. In particular, in the case where an area of the particle observed from a direction where a project area thereof becomes maximum (that is, an area of each particle at a planar view thereof) is defined as $S_1$ ($\mu m^2$) and an area of the particle observed from a direction where the area of the particle observed from directions orthogonal to the above observation direction becomes maximum is defined as $S_0$ ($\mu m^2$), especially, a ratio of $S_1$ to $S_0$ ($S_1/S_0$) is preferably 2 or more, more preferably 5 or more, and even more preferably or more. For example, as the value of this ratio, an average value of the values of the ratios obtained by observing arbitrary 10 particles can be used.

An average thickness of the particles of the aluminum pigment is preferably in the range of 10 nm or more but 100 nm or less, and more preferably in the range of 20 nm or more but 50 nm or less. This makes it possible to further improve the gloss and the high-grade sense of the printed object to be produced using the ultraviolet ray curable ink composition. Further, this also makes it possible to make the storage stability and the ejection stability of the ultraviolet ray curable ink composition more excellent.

An average particle size in 50% of the particles of the aluminum pigment is preferably in the range of 0.5 µm or more but 3.0 µm or less, and more preferably in the range of 0.6 µm or more but 1.0 µm or less. This makes it possible to further improve the gloss and the high-grade sense of the printed object to be produced using the ultraviolet ray curable ink composition. Further, this also makes it possible to make the storage stability and the ejection stability of the ultraviolet ray curable ink composition more excellent.

A ratio of the aluminum pigment contained in the ultraviolet ray curable ink composition is preferably in the range of 0.5 mass % or more but 10.0 mass % or less, and more preferably in the range of 1.0 mass % or more but 5.0 mass % or less.

Polymerizable Compound

A polymerizable compound is a component capable of being cured due to polymerization thereof by being irradiated with an ultraviolet ray. By containing such a component, it is possible to improve the wear resistance, the water resistance, the solvent resistance and the like of the printed object to be produced using the ultraviolet ray curable ink composition.

The polymerizable compound is of a liquid state, and preferably functions as a dispersion medium capable of dispersing the aluminum pigment in the ultraviolet ray curable ink composition. In this case, since another dispersion medium, which is removed (vapored) in the course of producing the printed object, not have to be used, and therefore a step of removing the dispersion medium not have to be provided in the course of producing the printed object, it becomes possible to especially improve productivity of the printed object. Further, since a dispersion medium generally utilized as an organic solvent not have to be used, it is possible to prevent a problem resulted from a volatile organic compound (VOC) from being generated. Furthermore, by containing the polymerizable compound, it is also possible to improve adhesion of the printed portion to be formed using the ultraviolet ray curable ink composition with respect to various kinds of recording media (base). In other words, by containing the polymerizable compound, the ultraviolet ray curable ink composition can exhibit excellent media responsibility.

The polymerizable compound has only to be a component capable of being polymerized by ultraviolet ray irradiation. As such a polymerizable compound, various kinds of monomers and various kinds of oligomers (including a dimmer, a trimmer and the like) can be used. It is preferred that the ultraviolet ray curable ink composition contains at least a monomer component as the polymerizable compound. Since the monomer is a component having generally a viscosity lower than that of the olygomer component or the like, the use of the monomer is advantageous in that the ejection stability of the ultraviolet ray curable ink composition can make especially excellent.

Examples of the monomer of the polymerizable compound include isobornyl acrylate, 4-hydroxy butyl acrylate, lauryl acrylate, 2-methoxy ethyl acrylate, phenoxy ethyl acrylate, isooctyl acrylate, stearyl acrylate, cyclohexyl acrylate, 2-ethoxy ethyl acrylate, benzyl acrylate, 1H,1H,5H-octafluoro pentyl acrylate, 1H,1H,5H-octafluoro pentyl methacrylate, 2-hydroxy ethyl acrylate, 2-hydroxy propyl acrylate, isobutyl acrylate, t-butyl acrylate, tetrahydro furfuryl acrylate, ethyl carbitol acrylate, 2,2,2-trifluoro ethyl acrylate, 2,2,2-trifluoro ethyl methacrylate, 2,2,3,3-tetrafluoro propyl acrylate, methoxy triethylene glycol acrylate, PO-modified nonyl phenol acrylate, EO-modified nonyl phenol acrylate, EO-modified 2-ethyl hexyl acrylate, phenyl glycidyl ether acrylate, phenoxy diethylene glycol acrylate, EO-modified phenol acrylate, EO-modified cresol acrylate, methoxy polyethylene glycol acrylate, dipropylene glycol acrylate, dicyclopentenyl acrylate, dicyclopentenyl oxy ethyl acrylate, 2-n-butyl-2-ethyl-1,3-propanediol diacrylate, tripropylene glycol diacrylate, tetraethylene glycol diacrylate, 1,9-nonanediol diacrylate, 1,4-butanediol diacrylate, bisphenol A EO-modified diacrylate, 1,6-hexanediol diacrylate, polyethylene glycol 200 diacrylate, polyethylene glycol 300 diacrylate, neopentyl glycol hydroxyl pivalate diacrylate, 2-ethyl-2-butyl-propanediol diacrylate, polyethylene glycol 400 diacrylate, polyethylene glycol 600 diacrylate, polypropylene glycol diacrylate, PO-modified bisphenol A diacrylate, EO-modified hydrogenated bisphenol A diacrylate, dipropylene glycol diacrylate, polypropylene glycol diacrylate, trimethylol propane triacrylate, pentaerythritol triacrylate, trimethylol propane EO-modified triacrylate, glycerine PO-added triacrylate, trisacryloyl oxy ethyl phosphate, pentaerythritol tetraacrylate, PO-modified trimethylol propane triacrylate, tris(acryloxy ethyl) isocyanurate, 2-(2-vinyloxy ethoxy) ethyl acrylate, 1-adamantyl methyl acrylate, 1-adamantyl acrylate, 2-acryloyloxy ethyl phthalate, isobornyl acrylate, 3-acryloyloxy propyl acrylate, acryloyl morpholine, lypoxy SP series, dicyclo pentanyl acrylate, 2-hydroxy 3-phenoxy propyl acrylate, w-carboxy acryloyloxy ethyel phthalate, dimethylol dicyclopentane diacrylate, diacrylated isocyanurate/triacrylated mixture, neopentyl glycol diacrylate, ditrimethylol propane tetra acrylate, dipentaerythritol penta/hexaacrylate, dipentaerythritol hexaacrylate, diethylene glycol diethyl ether, and the like. Among them, the 4-hydroxy butyl acrylate, the phenoxy ethyl acrylate, the dicyclopentenyl acrylate, the dicyclopentenyl oxy ethyl acrylate, the tripropylene glycol diacrylate, the tetraethylene glycol diacrylate, the dipropylene glycol diacrylate, the trimethylol propane triacrylate, the trimethylol propane EO-modified triacrylate, the pentaerythritol tetraacrylate, the pentaerythritol triacrylate or the 2-(2-vinyloxy ethoxy)ethyl acrylate is preferable.

It is especially preferred that the ultraviolet ray curable ink composition contains the phenoxy ethyl acrylate as the polymerizable compound. In this case, it is possible to improve the storage stability and the ejection stability of the ultraviolet ray curable ink composition, and to make reactivity (curing property) of the ultraviolet ray curable ink composition ejected by the ink jet method especially excellent. This makes it possible to further improve the productivity of the printed object and the wear resistance and the like of the pattern to be formed.

Further, it is preferred that the ultraviolet ray curable ink composition contains at least one selected from the group consisting of the 2-(2-vinyloxy ethoxy)ethyl acrylate, dipropylene glycol diacrylate, tripropylene glycol diacrylate, 2-hydroxy 3-phenoxy propyl acrylate and the 4-hydroxy butyl acrylate as the polymerizable compound in addition to the phenoxy ethyl acrylate. In this case, it is possible to improve the storage stability and the ejection stability of the ultraviolet ray curable ink composition, and to make the reactivity (curing property) of the ultraviolet ray curable ink composition ejected by the ink jet method especially excellent. This makes it possible to further improve the productivity of the printed object and the wear resistance and the like of the pattern to be formed.

Furthermore, it is preferred that the ultraviolet ray curable ink composition contains at least one selected from the group consisting of the dimethylol tricyclodecane diacrylate, dimethylol dicyclo pentane diacrylate, dicyclo pentenyl acrylate, dicyclo pentanyl acrylate, isobornyl acrylate, acryloyl morpholine, tetrahydro furfuryl acrylate, ethyl carbitol acrylate, and methoxy triethylene glycol acrylate as the polymerizable compound. This makes it possible to further improve the storage stability and the ejection stability of the ultraviolet ray curable ink composition and the wear resistance and the like of the pattern to be formed.

Moreover, the ultraviolet ray curable ink composition may contain an oligomer as the polymerizable compound in addition to the monomer. It is especially preferred that the ultraviolet ray curable ink composition contains a polyfunctional oligomer. This makes it possible to especially improve the storage stability of the ultraviolet ray curable ink composition and the wear resistance and the like of the pattern to be formed. In this regard, it is to be noted that, in the invention, the polymerizable compound having a molecular skeleton including repeating units and a molecular weight of 600 or more is referred to as "oligomer". As the oligomer, an urethane oligomer in which the repeating units are urethane units or an epoxy oligomer in which the repeating units are epoxy units can be preferably used.

An amount of the polymerizable compound contained in the ultraviolet ray curable ink composition is preferably 70 mass % or more but 99 mass % or less, and more preferably in the range of 80 mass % or more but 98 mass % or less. This makes it possible to especially improve the storage stability, the ejection stability and the curing property of the ultraviolet ray curable ink composition, and the gloss, the wear resistance and the like of the printed object to be produced using the ultraviolet ray curable ink composition. In this regard, it is to be noted that the ultraviolet ray curable ink composition may contain two or more kinds of compounds as the polymerizable compound. In this case, it is preferred that a total amount of these compounds is set to a value falling within the above range.

Substance A

Furthermore, it is preferred that the ultraviolet ray curable ink composition of the invention includes a substance A having a partial structure represented by the following formula (5).

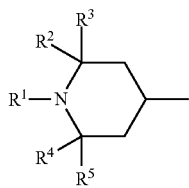

(5)

where $R^2$ is a hydrogen atom, an oxygen radical, a hydrocarbon group or an alkoxy group, and each of $R^2$, $R^3$, $R^4$ and $R^5$ is independently a hydrogen atom or a hydrocarbon group.

In the case where the ultraviolet ray curable ink composition contains the substance A having such a structure together with the metal particles subjected to the surface treatment as described above and a basic polymer dispersant, it is possible to make the storage stability and the curing property of the ultraviolet ray curable ink composition excellent. Further, in the printed object to be produced using the ultraviolet ray curable ink composition, it is possible to exhibit the gloss and the high-grade sense provided inherently by aluminum more efficiently. Furthermore, it is also possible to make the gloss and the wear resistance of the printed portion superior, to thereby improve the durability of the printed object.

In the above formula (5), $R^1$ may be the hydrogen atom, the oxygen radical, the hydrocarbon group or the alkoxy group in which a chain type or alicyclic type hydrocarbon group is bonded to an oxygen atom, but is especially preferably the hydrogen atom, a methyl group or an octyl oxy group. This makes it possible to especially improve the storage stability and the ejection stability of the ultraviolet ray curable ink composition, and the gloss and the wear resistance of the printed portion to be formed using the ultraviolet ray curable ink composition.

Further, in the above formula (5), each of $R^2$, $R^3$, $R^4$ and $R^5$ may be independently the hydrogen atom or the hydrocarbon group, but is preferably an alkyl group having carbon atoms of 1 or more but 3 or less, and more preferably a methyl group. This makes it possible to especially improve the storage stability and the ejection stability of the ultraviolet ray curable ink composition, and the gloss and the wear resistance of the printed portion to be formed using the ultraviolet ray curable ink composition.

An amount of the substance A contained in the ultraviolet ray curable ink composition is preferably in the range of 0.1 mass % or more but 5.0 mass % or less, and more preferably in the range of 0.5 mass % or more but 3.0 mass % or less. This makes it possible to especially improve the storage stability, the ejection stability and the curing property of the ultraviolet ray curable ink composition, and the gloss, the wear resistance and the like of the printed object to be produced using the ultraviolet ray curable ink composition. In this regard, it is to be noted that the ultraviolet ray curable ink composition may contain two or more kinds of compounds as the substance A. In this case, it is preferred that a total amount of these compounds is set to a value falling within the above range.

In the case where the amount of the substance A contained in the ultraviolet ray curable ink composition is defined as $X_A$ [mass %] and the amount of the aluminum pigment contained therein is defined as $X_M$ [mass %], $X_A$ and $X_M$ satisfy preferably a relationship of $0.01 \leq X_A/X_M \leq 0.8$, and more preferably a relationship of $0.05 \leq X_A/X_M \leq 0.4$. By satisfying such a relationship, it is possible to especially improve the storage stability and the ejection stability of the ultraviolet ray curable ink composition, and to make the gloss and the wear resistance of the printed portion to be formed using the ultraviolet ray curable ink composition especially excellent.

Dispersant

The ultraviolet ray curable ink composition of the invention may contain a compound having a polymer structure and basic property as a dispersant in addition to the aluminum pigment as described above (hereinafter, referred to as "basic polymer dispersant").

This makes it possible to especially improve the storage stability and the ejection stability of the ultraviolet ray curable ink composition. Furthermore, it is possible to the gloss and the wear resistance of the printed portion to be formed using the ultraviolet ray curable ink composition especially excellent.

In this regard, it is to be noted, in the invention, that a specific molecular weight is not limited as long as the basic polymer dispersant has the basic property and the polymer structure.

The polymer structure constituting the basic polymer dispersant is not limited particularly. Examples of such a polymer structure include an acrylic-based polymer structure (including a copolymer), a methacrylic-based polymer structure (including a copolymer), a polyurethane-based polymer structure, a hydroxyl group-containing carboxylate ester structure, a polyether-based polymer structure, a silicone-based polymer structure and the like.

An amine number of the basic polymer dispersant is not limited particularly, but is preferably in the range of 3 mgKOH/g or more but 80 mgKOH/g or less, and more preferably in the range of 10 mgKOH/g or more but 70 mgKOH/g or less.

Examples of the basic polymer dispersant used in the invention include DISPERBYK-116 (produced by BYK Japan KK), DISPERBYK-182 (produced by BYK Japan KK), DISPERBYK-183 (produced by BYK Japan KK), DISPERBYK-184 (produced by BYK Japan KK), DISPERBYK-2155 (produced by BYK Japan KK), DISPERBYK-2164 (produced by BYK Japan KK), DISPERBYK-108 (produced by BYK Japan KK), DISPERBYK-112 (produced by BYK Japan KK), DISPERBYK-198 (produced by BYK Japan KK), DISPERBYK-2150 (produced by BYK Japan KK), PAA-1112 (produced by Nitto Boseki Co., Ltd.), and the like.

An amount of the basic polymer dispersant contained in the ultraviolet ray curable ink composition is preferably in the range of 0.01 mass % or more but 5.0 mass % or less, and more preferably in the range of 0.1 mass % or more but 2.0 mass % or less. This makes it possible to especially improve the storage stability, the ejection stability and the curing property of the ultraviolet ray curable ink composition, and the gloss, the wear resistance and the like of the printed object to be produced using the ultraviolet ray curable ink composition. In this regard, it is to be noted that the ultraviolet ray curable ink composition may contain two or more kinds of compounds as the basic polymer dispersant. In this case, it is preferred that a total amount of these compounds is set to a value falling within the above range.

Other Components

The ultraviolet ray curable ink composition of the invention may contain components other than the above mentioned components (that is, other components). Examples of such other components include a photopolymerization initiator, a slipping agent (leveling agent), a dispersing agent other than the basic polymer dispersant, a polymerization accelerator, a polymerization inhibitor, a penetration accelerator, a wetting agent (moisturizing agent), a coloring agent, a fixing agent, an antifungal agent, an antiseptic agent, an antioxidant, a chelating agent, a thickening agent, a sensitizing agent (sensitizing dye) and the like.

The photopolymerization initiator is not limited to a specific type, as long as it can generate active species such as radicals, cations and the like by being irradiated with an ultraviolet ray, and thus can start a polymerization reaction of the polymerizable compound. As the photopolymerization initiator, a photo radical polymerization initiator or a photo cation polymerization initiator can be used, but the photo radical polymerization initiator can be preferably used. In the case where the photopolymerization initiator is used, it is preferred that the photopolymerization initiator has an absorption peak within an ultraviolet region.

Examples of the photo radical polymerization initiator include aromatic ketones, an acyl phosphine oxide compound, an aromatic onium salt compound, an organic peroxide, a thiocompound (e.g., a thioxanthone compound, a thiophenyl group containing compound), a hexaaryl biimidazole compound, a ketooxime ester compound, a borate compound, an azinium compound, a metallocene compound, an activated ester compound, a compound including a carbon-halogen bond, an alkyl amine compound and the like.

From the viewpoint of solubility with respect to the polymerizable compound and a curing property thereof, among them, at least one selected from the group consisting of the acyl phosphine oxide compound and the thioxanthone compound is preferable, and a combination of the acyl phosphine oxide compound and the thioxanthone compound is more preferable.

Concrete examples of the photo radical polymerization initiator include acetophenone, acetophenone benzyl ketal, 1-hydroxy cyclohexyl phenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro benzophenone, 4,4'-dimethoxy benzophenone, 4,4'-diamino benzophenone, Michler's ketone, benzoin propyl ether, benzoin ethyl ether, benzyl dimethyl ketal, 1-(4-isopropyl phenyl)-2-hydroxy-2-methylpropane-1-on, 2-hydroxy-2-methyl-1-phenylpropane-1-on, thioxanthone, diethyl thioxanthone, 2-isopropyl thioxanthone, 2-chloro thioxanthone, 2-methyl-1-[4-(methylthio)phenyl]-2-morpholino-propane-1-on, bis(2,4,6-trimethyl benzoyl)-phenyl phosphineoxide, 2,4,6-trimethyl benzoyl-diphenyl phosphineoxide, 2,4-diethyl thioxanthone, bis(2,6-dimethoxy benzoyl)-2,4,4-trimethyl pentyl phosphineoxide, and the like. One of them can be used alone or two or more of them can be used in combination.

An amount of the photopolymerization initiator contained in the ultraviolet ray curable ink composition is preferably in the range of 0.5 mass % or more but 10 mass % or less. If the amount of the photopolymerization initiator falls within the above range, a curing rate of the ultraviolet ray curable ink composition by the ultraviolet ray irradiation becomes sufficiently high, and an insoluble matter of the photopolymerization initiator or coloring resulting from the photopolymerization initiator is hardly generated.

In the case where the ultraviolet ray curable ink composition contains the slipping agent, a surface of the printed object becomes smooth due to a leveling effect thereof. This makes it improve the wear resistance of the printed object.

The slipping agent is not limited to a specific kind. As the slipping agent, a silicone-based surfactant such as a polyester-modified silicone or a polyether-modified silicone can be used, and polyether-modified polydimethyl siloxane or polyester-modified polydimethyl siloxane can be preferably used.

The ultraviolet ray curable ink composition of the invention may contain the polymerization inhibitor. However, even if the ultraviolet ray curable ink composition contains the polymerization inhibitor, an amount of the polymerization inhibitor contained in the ultraviolet ray curable ink composition is preferably 0.6 mass % or less, and more preferably 0.2 mass % or less. This makes it possible to adjust the amount of the polymerizable compound contained in the ultraviolet ray curable ink composition to a relatively high value. Therefore, it is possible to especially improve the wear resistance and the like of the printed portion to be formed using the ultraviolet ray curable ink composition. Further, in the invention, even in the case where the amount of the polymerization inhibitor is relatively lower in such a way, it is possible to make the storage stability and the ejection stability of the ultraviolet ray curable ink composition sufficiently excellent.

Further, it is preferred that the ultraviolet ray curable ink composition of the invention does not contain an organic solvent which would be removed (vapored) during steps of producing the printed object. This makes it possible to effectively prevent a problem resulted from a volatile organic compound (VOC) from being generated.

A viscosity at room temperature (20° C.) of the ultraviolet ray curable ink composition of the invention is preferably 20 mPa·s or less, and more preferably in the range of 3 mPa·s or more but 15 mPa·s or less. This makes it possible to appropriately eject the ultraviolet ray curable ink composition using the ink jet method.

Printed Object

Next, a printed object of the present invention will be described.

The printed object of the invention is produced by applying the above mentioned ultraviolet ray curable ink composition onto a recording medium, and then irradiating the ultraviolet ray curable ink composition with an ultraviolet ray. Such a printed object is provided with a pattern (printed portion) having high gloss and wear resistance.

As described above, the ultraviolet ray curable ink composition according to the invention contains the polymerizable compound, and thus exhibits excellent adhesion with respect to the recording medium. Therefore, since the ultraviolet ray curable ink composition of the invention exhibits the excellent adhesion with respect to the recording medium, the recording medium may be any types. As the recording medium, an absorbent medium or an unabsorbent medium may be used. For example, a paper (e.g., a plain paper, a special paper for ink jet, a coated art paper), a plastic material, a metal, a ceramics, a timber, a shell, a natural or synthetic fiber such as cotton, polyester or wool, a non-woven fabric or the like can be used.

The printed object of the invention may be used in any applications, for example, may be used in trinkets or articles other than the trinkets. Concrete examples of the printed object of the invention include: vehicular interior trims such as a console lid, a switch base, a center cluster, an interior panel, an emblem, a center console and meter nameplate; operating portions of various kinds of electronic devices (keyswitchs); an indoor advertisement material; an outdoor advertisement material such as a confectionery box for gift, a box for cosmetics and tarpaulin; trims exhibiting decorativeness; presentments such as an index and a logo; and the like.

As a system for ejecting liquid droplets (that is, a system of the ink jet method), a piezo system, a system for ejecting an ink by bubbles which are generated by heating the ink, or the like can be used. However, the piezo system is preferable, for the reason that the ultraviolet ray curable ink composition is difficult to be deteriorated, and the other reasons.

The ejection of the ultraviolet ray curable ink composition by the ink jet method can be carried out using a well-known liquid droplet ejection device.

The ultraviolet ray curable ink composition ejected by the ink jet method is cured by being irradiated with an ultraviolet ray.

As an ultraviolet ray irradiation source, for example, a mercury lamp, a metal halide lamp, an ultraviolet ray light emitting diode (UV-LED), an ultraviolet ray laser diode (UV-LD) or the like can be used. Among them, the ultraviolet ray light emitting diode (UV-LED) or the ultraviolet ray laser diode (UV-LD) is preferable, for the reason that such a source has a small size, a long life time, high efficiency and a low cost.

While the invention has been described hereinabove based on the preferred embodiments, the invention is not limited thereto.

EXAMPLES

Next, description will be made on concrete examples of the invention.

1. Preparation of Ink Jet Composition (Ultraviolet Ray Curable Ink Composition)

Example 1

First, prepared was a film having a flat surface and made of polyethylene terephthalate (surface roughness Ra: 0.02 μm or less).

Next, silicone oil was applied onto the entirety of one surface of the film.

Next, a coat made of Al was formed onto a surface of the film on which the silicone oil was applied using an evaporation method.

The film (base) made of polyethylene terephthalate, on which the Al coat was formed, was dipped into a liquid constituted of diethylene glycol diethyl ether, and then ultrasonic vibration was applied thereto. In this way, obtained was a dispersing element (dispersing liquid) of scaly particles (that is, particles to be used as base particles) each made of Al. An amount of the scaly particles each made of Al in the dispersing element was 3.7 mass %.

Next, $CH_{12}H_{25}(O)P(OH)(OCH_2CH_3)$ as an alkyl phosphate was added into the dispersing element containing the particles made of Al and obtained as described above to obtain a mixture. Ultrasonic vibration was applied to the mixture at a liquid temperature of 55° C. for 3 hours, so that the particles made of Al were subjected to a surface treatment. Thereafter, the centrifugal setting of the particles made of Al which were subjected to the surface treatment (aluminum pigment) was carried out with a centrifugal machine (6000 rpm×30 minutes) to obtain a supernatant part of the mixture. Thus, the supernatant part was discarded. Next, a mixture of diethyleneglycol diethylether and the metal particles was obtained, namely, diethyleneglycol diethylether was added to the resultant which the supernatant part was removed. Thereafter, the ultrasonic vibration was applied to the mixture to re-disperse the aluminum pigment in the mixture, so that a dispersion liquid (re-dispersion liquid) in which an amount of the aluminum pigment was 3.7 mass % was obtained. The re-dispersion liquid was concentrated with an evaporator, so that a paste-like dispersion liquid (dispersion medium: diethyleneglycol diethylether) in which an amount of the aluminum pigment was 10 mass % was obtained. An average particle size and an average thickness of particles of the thus obtained aluminum pigment were 0.8 μm and 60 nm, respectively.

In this regard, the obtained aluminum pigment was subjected to an X-ray photoelectron spectrometer ("ES-CALAB250" produced by ThermoFisher SCIENTIFIC) to obtain an X-ray photoelectron spectrum having a wave form. Then, when a waveform separation was performed by using a Voigt function (the following separation expression) in such an X-ray photoelectron spectrum, it was confirmed that the X-ray photoelectron spectrum had peaks in the rage of 190 eV or more but 192 eV or less.

Separation Expression:

$$y = y_0 + A \frac{2\ln 2}{\pi^{3/2}} \frac{w_L}{w_G^2} \int_{-\infty}^{\infty} \frac{e^{-t^2}}{\left(\sqrt{\ln 2} \frac{w_L}{w_G}\right)^2 + \left(\sqrt{4\ln 2} \frac{x - x_e}{w_G} - t\right)^2} dt$$

where $y_o$=offset, $X_c$=center, A=amplitude, $w_G$=Gaussian width, and $w_L$=Lorentzian width.

Next, a paste-like dispersion liquid containing the aluminum pigment was mixed with DISPERBYK-183 (produced by BYK Japan KK) as a dispersant (basic polymer dispersant) having a polymer structure and basic property, phenoxy ethyl acrylate, Irgacure 819 (produced by BASF Japan Ltd.) as a photopolymerization initiator, Speedcure TPO (produced by ACETO Corporation) as a photopolymerization initiator, Speedcure DETX (produced by Lambson Limited) as a photopolymerization initiator, and a substance A having a chemical structure represented by the following formula (6). By doing so, obtained was an ink jet composition (ultraviolet ray curable ink composition).

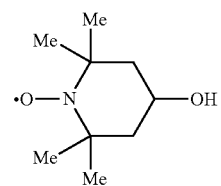

(6)

Examples 2 to 16

In each of the Examples 2 to 16, an ink jet composition (ultraviolet ray curable ink composition) was prepared in the same manner as the Example 1, except that a constitution of the aluminum pigment became as shown in Tables 1 and 2 by changing the construction of the aluminum pigment (composition of each base particle and a kind of phosphate compound used for the surface treatment) as shown in Tables 1 and 2, and changing the kinds and ratio of the raw materials for preparing the ink jet composition (ultraviolet ray curable ink composition).

In this regard, the obtained aluminum pigment was subjected to the X-ray photoelectron spectrometer ("ES-CALAB250" produced by ThermoFisher SCIENTIFIC) to obtain the X-ray photoelectron spectrum having the wave form. Then, when the waveform separation was performed by using the Voigt function (the above separation expression) in such an X-ray photoelectron spectrum, it was confirmed that the X-ray photoelectron spectrum had the peaks in the rage of 190 eV or more but 192 eV or less.

Comparative Example 1

An ink jet composition (ultraviolet ray curable ink composition) was prepared in the same manner as Example 1, except that particles each made of Al and not subjected to the surface treatment were used as the aluminum pigment.

In this regard, the obtained aluminum pigment was subjected to the X-ray photoelectron spectrometer ("ESCALAB250" produced by ThermoFisher SCIENTIFIC) to obtain the X-ray photoelectron spectrum having the wave form. Then, when the waveform separation was performed by using the Voigt function (the above separation expression) in such an X-ray photoelectron spectrum, it was confirmed that the X-ray photoelectron spectrum did not have the peaks in the rage of 190 eV or more but 192 eV or less.

Comparative Example 2

An ink jet composition (ultraviolet ray curable ink composition) was prepared in the same manner as Comparative Example 1, except that spherical Al particles produced using a gas atomizing method (not subjected to the surface treatment) were used as the aluminum pigment.

In this regard, the obtained aluminum pigment was subjected to the X-ray photoelectron spectrometer ("ESCALAB250" produced by ThermoFisher SCIENTIFIC) to obtain the X-ray photoelectron spectrum having the wave form. Then, when the waveform separation was performed by using the Voigt function (the above separation expression) in such an X-ray photoelectron spectrum, it was confirmed that the X-ray photoelectron spectrum did not have the peaks in the rage of 190 eV or more but 192 eV or less.

The constitutions of the ink jet compositions obtained in the Examples and the Comparative Examples were shown in Table 1 and Table 2 as a whole. In Tables, indicated were $CH_{12}H_{25}(O)P(OH)(OCH_2CH_3)$ as "S1", $(CH_{14}H_{29})_3(O)P$ as "S2", $(CH_{16}H_{33})_2(O)P(OH)$ as "S3", $CH_{18}H_{32}(O)P(OH)(OCH_2CH_3)$ as "S4", $(CH_{18}H_{37})_2(O)P(C_{16}H_{33})$ as "S5", $CH_{14}H_{29}(O)P(OH)(OCH_2CH_2CH_2CH_3)$ as "S6", $CF_3(CF_2)_5(CH_2)_2O—PO(OH)_2$ as "F1", $CF_3(CF_2)_5(CH_2)_2—PO(OH)_2$ as "F2", $CF_3(CF_2)_5(CH_2)_2—PO(OH)_2$ as "F3", $CF_3(CF_2)_3(CH_2O)_{10}—PO(OH)_2$ as "F4", $CF_3(CF_2)_{11}O—PO(OH)_2$ as "F5", $CF_3(CF_2)_7—PO(OH)_2$ as "F6", $(CF_3(CF_2)_5(CH_2)_2O)_2—PO(OH)$ as "F7", $(CF_3(CF_2)(CH_2O))_3—PO$ as "F8", DISPERBYK-183 (produced by BYK Japan KK, an amine number is 17 mgKOH/g) as "D1", DISPERBYK-182 (produced by BYK Japan KK, an amine number is 13 mgKOH/g) as "D2", DISPERBYK-184 (produced by BYK Japan KK, an amine number is 15 mgKOH/g) as "D3", DISPERBYK-116 (produced by BYK Japan KK, an amine number is 65 mgKOH/g) as "D4", DISPERBYK-2155 (produced by BYK Japan KK, an amine number is 48 mgKOH/g) as "D5", DISPERBYK-2164 (produced by BYK Japan KK, an amine number is 14 mgKOH/g) as "D6", PAA-1112 (produced by Nitto Boseki Co., Ltd.) as "D7", phenoxy ethyl acrylate as "PEA", tripropylene glycol diacrylate as "TPGDA", dipropylene glycol diacrylate as "DPGDA", 2-hydroxy 3-phenoxypropyl acrylate as "HPPA", N-vinyl caprolactam as "VC", dimethylol tricyclodecane diacrylate as "DMTCDDA", dimethylol dicyclopentane diacrylate as "DMDCPTA", dicyclopentenyl acrylate as "DCPTeA", dicyclopentanyl acrylate as "DCPTaA", isobornyl acrylate as "IBA", acryloyl morpholine as "AM", tetrahydrofurfuryl acrylate as "THFA", ethylcarbitol acrylate as "ECA", methoxy triethylene glycol acrylate as "MTEGA", 2-(2-hydroxy ethoxy)ethyl acrylate as "VEER", 4-hydroxy butyl acrylate as "HBA", benzyl methacrylate as "BM", urethane acrylate as "UA", a compound represented by the above formula (6) (that is, the substance A) as "A1", a compound represented by the following formula (7) (that is, the substance A) as "A2", a compound represented by the following formula (8) (that is, the substance A) as "A3", a substance A represented by the following formula (9) as "A4", Irgacure 819 (produced by BASF Japan Ltd.) as "ic819", Speedcure TPO (produced by ACETO Corporation) as "scTPO", Speedcure DETX (produced by Lambson Limited) as "scDETX", UV-3500 (produced by BYK Japan KK) as "UV3500", hydroquinone monomethyl ether as "MEHQ". Furthermore, in the composition of the constituent material of the base particles in the Example 9 of Table 2, an amount of each element was shown in a ratio by weight. Furthermore, arbitrary 10 particles contained in each ink jet composition were observed. In each of the particles, an area of the particle observed from a direction where a project area thereof becomes maximum (that is, an area of each particle at a planar view thereof) is defined as $S_1$ ($\mu m^2$) and an area of the particle observed from a direction where the area of the particle observed from directions orthogonal to the above observation direction becomes maximum is defined as $S_0$ ($\mu^{-2}$), and a ratio of $S_1$ to $S_0$ ($S_1/S_0$) was calculated to obtain 10 values. An average of the calculated 10 values was indicated in Table 1 and Table 2 as a whole. Moreover, a viscosity at 20° C. of the ink jet composition (ultraviolet ray curable ink composition) obtained in each of the Examples, which was measured by using an oscillating type viscometer based on JIS Z8809, was a value falling within the range of 3 mPa·s or more but 15 mPa·s or less. In this regard, it is to be noted that each of D1 to D7 had the basic property and the polymer structure (basic polymer dispersant).

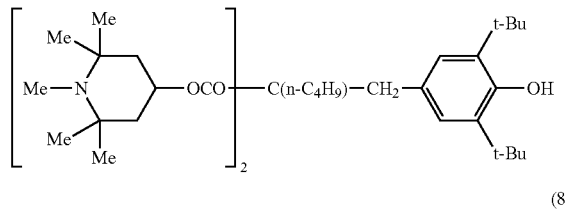

(7)

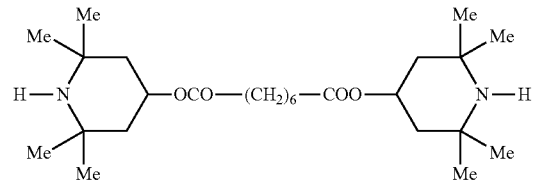

(8)

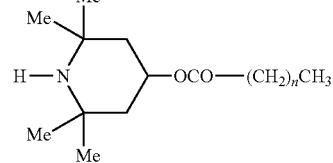

(9)

where the substance A represented by the formula (9) is a mixture of a plurality of compounds in which "n" in the formula is 10 or more but 19 or less (main components are compounds in which "n" in the formula is 15 or more but 18 or less).

TABLE 1

| | Constitution of metal powder | | Constitution of ink jet composition | | | | | | | | | | |
|---|---|---|---|---|---|---|---|---|---|---|---|---|---|
| | Constituent material of base particles | Material used for surface treatment | Metal particles of metal powder | | | | | Substance A | | Polymerizable compound | | Other components | |
| | | | Shape | Average particle size [μm] | $S_1/S_0$ | A-mount [mass %] | Dispersant | | A-mount [mass %] | Kind | Amount [mass %] | Kind | Amount [mass %] |
| | | | | | | | Kind | [mass %] | | | | | |
| | | | | | | | | | Kind | | | | |
| Ex. 1 | Al | S1 | Scaly | 0.8 | 50 | 2.0 | D1 | 0.16 | A1 | 0.28 | PEA | 87.56 | ic819/scTPO/scDETX | 4.0/4.0/2.0 |
| Ex. 2 | Al | S1 | Scaly | 0.9 | 39 | 4.0 | D1 | 0.8 | A2 | 0.8 | PEA/TPGDA/DPGDA/VC/DMTCDDA/HPPA | 35.0/35.3/2.0/5.5/4.0/2.2 | ic819/scTPO/scDETX/UV3500/MEHQ | 4.0/4.0/2.0/0.2/0.2 |
| Ex. 3 | Al | S1 | Scaly | 2.0 | 51 | 2.0 | D2 | 1.4 | A1 | 1.4 | PEA/VEEA/TPGDA/DPGDA/DMTCDDA/AM | 35.8/32.1/2.0/5.5/4.0/5.6 | ic819/scTPO/scDETX/UV3500 | 4.0/4.0/2.0/0.2 |
| Ex. 4 | Al | S2 | Scaly | 1.1 | 25 | 2.0 | D3 | 0.4 | A1 | 0.4 | PEA/DCPTeA/DMDCPTA/IBA/HBA | 36.2/37.5/2.0/9.5/1.6 | ic819/scTPO/scDETX/UV3500/MEHQ | 4.0/4.0/2.0/0.2/0.2 |
| Ex. 5 | Al | S3 | Scaly | 1.0 | 29 | 2.0 | D4 | 0.3 | A3 | 0.3 | PEA/VEEA/TPGDA/DPGDA/BM/DMTCDDA/UA | 36.2/34.6/1.0/2.0/5.5/4.0/3.9 | ic819/scTPO/scDETX/UV3500/MEHQ | 4.0/4.0/0.2/0.2 |
| Ex. 6 | Al | S5 | Scaly | 0.7 | 37 | 4.0 | D5 | 0.2 | A1 | 0.2 | PEA/VEEA | 46.8/42.2 | ic819/scTPO/UV3500/MEHQ | 4.0/2.0/0.2/0.2 |
| Ex. 7 | Al | S4 | Scaly | 0.9 | 38 | 2.0 | D6 | 1.2 | A4 | 1.2 | PEA/DCPTaA/THFA | 35.8/39.1/11.5 | ic819/scTPO/scDETX/UV3500/MEHQ | 4.0/4.0/2.0/0.2/0.2 |
| Ex. 8 | Al | S6 | Scaly | 1.5 | 21 | 1.0 | D7 | 1.0 | A1 | 1.0 | PEA/ECA/MTEGA/DPGDA/BM | 36.3/39.8/2.0/5.5/4.0 | ic819/scTPO/scDETX/UV3500/MEHQ | 4.0/4.0/2.0/0.2/0.2 |

TABLE 2

| | Constitution of metal powder | | Constitution of ink jet composition | | | | | | | | | | |
|---|---|---|---|---|---|---|---|---|---|---|---|---|---|
| | Constituent material of base particles | Material used for surface treatment | Metal particles of metal powder | | | | | Substance A | | Polymerizable compound | | Other components | |
| | | | Shape | Average particle size [μm] | $S_1/S_0$ | A-mount [mass %] | Dispersant | | | | Kind | Amount [mass %] | Amount [mass %] |
| | | | | | | | Kind | Amount [mass %] | Kind | Amount [mass %] | | | Kind |
| Ex. 9 | Al | F1 | Scaly | 0.8 | 50 | 2.0 | D1 | 0.16 | A1 | 0.28 | PEA | 87.56 | ic819/scTPO/scDETX | 4.0/4.0/2.0 |
| Ex. 10 | Al | F2 | Scaly | 0.9 | 39 | 4.0 | D1 | 0.8 | A2 | 0.8 | PEA/TPGDA/DPGDA/VC/DMTCDDA/HPPA | 35.0/35.3/2.0/5.5/4.0/2.2 | ic819/scTPO/scDETX/UV3500/MEHQ | 4.0/4.0/2.0/0.2/0.2 |
| Ex. 11 | Al | F3 | Scaly | 2.0 | 51 | 2.0 | D2 | 1.4 | A1 | 1.4 | PEA/VEEA/TPGDA/DPGDA/ | 35.8/32.1/2.0/5.5/4.0/5.6 | ic819/scTPO/scDETX/UV3500 | 4.0/4.0/2.0/0.2 |

TABLE 2-continued

| | Constitution of metal powder | | Constitution of ink jet composition | | | | | | | | | | |
|---|---|---|---|---|---|---|---|---|---|---|---|---|---|
| | Constituent material of base particles | Material used for surface treatment | Metal particles of metal powder | | | | Dispersant | | Substance A | | Polymerizable compound | | Other components | |
| | | | Shape | Average particle size [μm] | $S_1/S_0$ | Amount [mass %] | Kind | Amount [mass %] | Kind | Amount [mass %] | Kind | Amount [mass %] | Kind | Amount [mass %] |
| Ex. 12 | Al | F4 | Scaly | 1.1 | 25 | 2.0 | D3 | 0.4 | A1 | 0.4 | DMTCDDA/AM PEA/DCPTeA/DMDCPTA/IBA/HBA | 36.2/37.5/2.0/9.5/1.6 | ic819/scTPO/scDETX/UV3500/MEHQ | 4.0/4.0/2.0/0.2/0.2 |
| Ex. 13 | Al | F5 | Scaly | 1.0 | 29 | 2.0 | D4 | 0.3 | A3 | 0.3 | PEA/VEEA/TPGDA/DPGDA/BM/DMTCDDA/UA | 36.2/34.6/1.0/2.0/5.5/4.0/3.9 | ic819/scTPO/UV3500/MEHQ | 4.0/4.0/0.2/0.2 |
| Ex. 14 | Al | F6 | Scaly | 0.7 | 37 | 4.0 | D5 | 0.2 | A1 | 0.2 | PEA/VEEA | 46.8/42.2 | ic819/scTPo/UV3500/MEHQ | 4.0/2.0/0.2/0.2 |
| Ex. 15 | Al | F7 | Scaly | 0.9 | 38 | 2.0 | D6 | 1.2 | A4 | 1.2 | PEA/DCPTaA/THFA | 35.8/39.1/11.5 | ic819/scTPO/scDETX/UV3500/MEHQ | 4.0/4.0/2.0/0.2/0.2 |
| Ex. 16 | Al | F8 | Scaly | 1.5 | 21 | 1.0 | D7 | 1.0 | A1 | 1.0 | PEA/ECA/MTEGA/DPGDA/BM | 36.3/39.8/2.0/5.5/4.0 | ic819/scTPO/scDETX/UV3500/MEHQ | 4.0/4.0/2.0/0.2/0.2 |

TABLE 3

| | Constitution of metal powder | | Constitution of ink jet composition | | | | | | | | | | |
|---|---|---|---|---|---|---|---|---|---|---|---|---|---|
| | Constituent material of base particles | Material used for surface treatment | Metal particles of metal powder | | | | Dispersant | | Substance A | | Polymerizable compound | | Other components | |
| | | | Shape | Average particle size [μm] | $S_1/S_0$ | Amount [mass %] | Kind | Amount [mass %] | Kind | Amount [mass %] | Kind | Amount [mass %] | Kind | Amount [mass %] |
| Com. Ex. 1 | Al | — | Scaly | 0.8 | 50 | 2.0 | D1 | 0.16 | A1 | 0.28 | PEA | 87.56 | ic819/scTPO/scDETX | 4.0/4.0/2.0 |
| Com. Ex. 2 | Al | — | Spherical | 0.8 | 1 | 2.0 | D1 | 0.16 | A1 | 0.28 | PEA | 87.56 | ic819/scTPO/scDETX | 4.0/4.0/2.0 |

2. Evaluation of Stability of Liquid Droplet Ejection (Ejection Stability Evaluation)

The ink jet composition prepared in each of the Examples and the Comparative Examples was evaluated by tests described below.

First, a liquid droplet ejection device provided inside a chamber (thermal chamber) and the ink jet composition obtained in each of the Examples and the Comparative Examples were prepared. Driving waveforms of piezo elements were optimized, and then 2,000,000 liquid droplets of the ink jet composition were continuously ejected from the respective nozzles of the liquid droplet ejection head under the environment of 25° C. and 55% RH. Thereafter, operation of the liquid droplet ejection device was stopped, and then was left for 240 hours under the environment of 25° C. and 55% RH in a state that the ink jet composition was filled into flow passes of the liquid droplet ejection device.

Next, 4,000,000 liquid droplets of the ink jet composition were continuously ejected from the respective nozzles of the ink jet head under the environment of 25° C. and 55% RH. On each of 4,000,000 liquid droplets ejected from the specified nozzles located at the vicinity of a central portion of the liquid droplet ejection head after a lapse of 150 hours, a shift length "d" between a center point of the spotted (landed) droplet and an objective point thereof to be spotted was measured. An average value of the shift lengths "d" was calculated. Based on the calculated average value, the stability of liquid droplet ejection was evaluated according to the following criteria including 5 grades. In this regard, it is to be noted that a smaller average value means that change of an ejecting direction of each liquid droplet is effectively prevented.

A: The average value of the shift lengths "d" is less than 0.17 μm.

B: The average value of the shift lengths "d" is 0.17 μm or more, but less than 0.24 μm.

C: The average value of the shift lengths "d" is 0.24 μm or more, but less than 0.27 μm.

D: The average value of the shift lengths "d" is 0.27 μm or more, but less than 0.31 μm.

E: The average value of the shift lengths "d" is 0.31 μm or more.

3. Frequency Characteristic of Ink Jet Composition

A liquid droplet ejection device provided inside a chamber (thermal chamber) and the ink jet composition obtained in each of the Examples and the Comparative Examples were prepared. Driving waveforms of piezo elements were optimized, and then the liquid droplets of the ink jet composition were ejected from all of the nozzles of the liquid droplet ejection head under the environment of 25° C. and 55% RH while changing a number of vibration (frequency) of the piezo elements. The time for ejecting the liquid droplets in each frequency was set to 10 minutes. At the time of completing the ejection for 10 minutes, frequencies in which a number of nozzles, which have not been ejected, was less than 1% with respect to all of the nozzles were set as a practicable maximum frequency. Thereafter, practicable frequencies were evaluated according to the following criteria including 4 grades in a frequency range. In this regard, it is to be noted that a larger value means that the frequency characteristic of each liquid droplet is excellent.

A: The frequency is 12 kHz or more.

B: The frequency is 7 kHz or more, but less than 12 kHz.

C: The frequency is 3 kHz or more, but less than 7 kHz.

D: The frequency is less than 3 kHz.

4. Evaluation of Storage Stability of Ink Jet Composition (Long-Term Stability Evaluation)

The ink jet composition prepared in each of the Examples and the Comparative Examples was left for 40 days under the environment of 40° C. Thereafter, the viscosity at 20° C. of the ink jet composition obtained in each of the Examples was measured using an oscillating type viscometer based on JIS 28809, and then an increasing ratio with respect to the viscosity of the ink jet composition just after prepared was calculated. Based on the increasing ratio of the viscosity, the storage stability was evaluated according to the following criteria including 5 grades.

A: The increasing ratio of the viscosity is less than 10%.

B: The increasing ratio of the viscosity is 10% or more, but less than 15%.

C: The increasing ratio of the viscosity is 15% or more, but less than 20%.

D: The increasing ratio of the viscosity is 20% or more, but less than 25%.

E: The increasing ratio of the viscosity is 25% or more, or generation of foreign materials is observed.

5. Curing Property

The ink jet composition prepared in each of the Examples and the Comparative Examples was loaded to an ink jet printer ("PM800C" produced by Seiko Epson Corporation), solid printing of the ink jet composition onto a recording medium having a thickness of 38 μm ("DIAFOIL G440E" produced by Mitsubishi Plastics Inc.) was carried out in an ink amount of 9 $g/m^2$ in wet, and then the ink jet composition was immediately irradiated with an ultraviolet ray (gap: 6 mm, peak wavelength: 365 nm, 1000 $mW/cm^2$) using a LED-UV lump ("RX firefly" produced by Phoseon Technology Inc.). Thereafter, it was confirmed whether or not the ink jet composition was cured. Based on the confirmation result, the curing property was evaluated according to the following criteria including 5 grades. The curing or non-curing of the ink jet composition was judged by rubbing a surface of the ink jet composition with a swab and observing whether or not a non-cured matter of the ink jet composition adhered to the swab. In this regard, it is to be noted that an ultraviolet ray irradiation amount in the followings A to E can be calculated by the number of seconds when the LED-UV lump was lighted.

A: The ink jet composition was cured by the ultraviolet ray irradiation amount less than 100 $mJ/cm^2$.

B: The ink jet composition was cured by the ultraviolet ray irradiation amount of 100 $mJ/cm^2$ or more, but less than 200 $mJ/cm^2$.

C: The ink jet composition was cured by the ultraviolet ray irradiation amount of 200 $mJ/cm^2$ or more, but less than 500 $mJ/cm^2$.

D: The ink jet composition was cured by the ultraviolet ray irradiation amount of 500 $mJ/cm^2$ or more, but less than 1,000 $mJ/cm^2$.

E: The ink jet composition was cured by the ultraviolet ray irradiation amount of 1,000 $mJ/cm^2$ or more, or was never cured.

6. Production of Printed Object

An interior panel as a printed object was produced using the ink jet composition prepared in each of the Examples and the Comparative Examples as follows.

First, the ink jet composition was loaded to an ink jet device.

Next, on a base material (recording medium) having a curved surface portion, which was formed using a polycarbonate sheet with a thickness of 2 mm ("CARBOGLASS polish" produced by ASAHI GLASS CO., LTD.), the ink jet composition was ejected in a predetermined pattern.

Thereafter, the ink jet composition was irradiated with an ultraviolet ray having a spectrum with maximum values at wavelengths of 365 nm, 380 nm and 395 nm and an radiation intensity of 180 $mW/cm^2$ for 15 seconds, and thus was cured. In this way, the interior panel was produced as the printed object.

In each of the Examples and the Comparative Examples, 10 interior panels (printed objects) were produced using the ink jet composition according to the above mentioned method.

Further, 10 interior panels (printed objects) were produced using the ink jet composition prepared in each of the Examples and the Comparative Examples in the same method as described above, except that a base material formed using a polyethylene terephthalate sheet with a thickness of 38 μm ("DIAFOIL G440E" produced by Mitsubishi Plastics Inc.), a base material formed using a low density polyethylene sheet ("T.U.X (L-LDPE) HC-E #80" produced by Mitsui Chemicals Tohcello Inc.), a base material formed using a biaxial stretching polypropylene sheet ("OP U-1 #60" produced by Mitsui Chemicals Tohcello Inc.), or a base material formed using a hard vinyl chloride sheet having a thickness of 0.5 mm ("SUNDAY SHEET (transparent)" produced by ACRYSUNDAY Co., Ltd.) was used.

7. Evaluation of Printed Object

Each of the printed objects produced in the above mentioned way was evaluated as follows.

7.1 Evaluation of Appearance of Printed Object

The printed objects produced using the ink jet composition prepared in each of the Examples and the Comparative Examples were visually observed, and appearance of each of the printed objects was evaluated according to the following criteria including 7 grades.

A: The printed object exhibits gloss with very high-grade sense, and has extra excellent appearance.

B: The printed object exhibits gloss with very high-grade sense, and has very excellent appearance.

C: The printed object exhibits gloss with high-grade sense, and has excellent appearance.

D: The printed object exhibits gloss with high-grade sense, and has appropriate appearance.

E: The printed object exhibits inferior gloss, and has slightly poor appearance.

F: The printed object exhibits inferior gloss, and has poor appearance.

G: The printed object exhibits inferior gloss, and has extra poor appearance.

7.2 Glossiness

Glossiness of pattern formation portions of the printed objects produced using the ink jet composition prepared in each of the Examples and the Comparative Examples was measured at a measurement angle of 60° using a gloss meter ("MINOLTA MULTI GLOSS 268"), and the glossiness was evaluated according to the following criteria including 4 grades.

wear resistance test was calculated, and then the wear resistance was evaluated according to the following criteria including 5 grades.

A: The decreasing ratio of the glossiness is less than 10%.

B: The decreasing ratio of the glossiness is 10% or more, but less than 20%.

C: The decreasing ratio of the glossiness is 20% or more, but less than 30%.

D: The decreasing ratio of the glossiness is 30% or more, but less than 40%.

E: The decreasing ratio of the glossiness is 40% or more, or the particles are removed, so that the surface of the recording medium is exposed.

These results are indicated in Table 4. In this regard, it is to be noted that indicated are the printed object formed using the base material made of polycarbonate as "M1", the printed object formed using the base material made of polyethylene terephthalate as "M2", the printed object formed using the base material made of low density polyethylene as "M3", the printed object formed using the base material made of biaxial stretching polypropylene as "M4", and the printed object formed using the base material made of hard vinyl chloride as "M5".

TABLE 4

| | Ejection stability | Frequency characteristic | Long-term stability | Curing property | Appearance of printed object | | | | | Glossiness | | | | | Wear resistance | | | | |
|---|---|---|---|---|---|---|---|---|---|---|---|---|---|---|---|---|---|---|---|
| | | | | | M1 | M2 | M3 | M4 | M5 | M1 | M2 | M3 | M4 | M5 | M1 | M2 | M3 | M4 | M5 |
| Ex. 1 | A | A | A | A | A | A | A | A | A | A | A | A | A | A | A | A | A | A | A |
| Ex. 2 | A | A | A | A | A | A | A | A | A | A | A | A | A | A | A | A | A | A | A |
| Ex. 3 | A | A | A | A | A | A | A | A | A | A | A | A | A | A | A | A | A | A | A |
| Ex. 4 | B | A | B | A | A | A | A | A | A | B | B | B | B | B | A | A | A | A | A |
| Ex. 5 | A | A | A | A | A | A | A | A | A | A | A | A | A | A | A | A | A | A | A |
| Ex. 6 | B | A | B | A | A | A | A | A | A | B | B | B | B | B | A | A | A | A | A |
| Ex. 7 | A | A | A | A | A | A | A | A | A | A | A | A | A | A | A | A | A | A | A |
| Ex. 8 | B | A | A | A | A | A | A | A | A | A | A | A | A | B | B | B | B | B | B |
| Ex. 9 | A | A | A | A | A | A | A | A | A | A | A | A | A | A | A | A | A | A | A |
| Ex. 10 | A | A | A | A | A | A | A | A | A | A | A | A | A | A | A | A | A | A | A |
| Ex. 11 | A | A | A | A | A | A | A | A | A | A | A | A | A | A | A | A | A | A | A |
| Ex. 12 | A | A | A | A | A | A | A | A | A | A | A | A | A | A | A | A | A | A | A |
| Ex. 13 | A | A | B | A | A | A | A | A | A | B | B | B | B | B | A | A | A | A | A |
| Ex. 14 | A | A | A | A | A | A | A | A | A | A | A | A | A | A | A | A | A | A | A |
| Ex. 15 | B | B | B | A | A | A | A | A | A | B | B | B | B | B | A | A | A | A | A |
| Ex. 16 | A | A | A | A | A | A | A | A | A | A | A | A | A | A | A | A | A | A | A |
| Com. Ex. 1 | B | A | B | A | A | A | A | A | A | B | B | B | B | B | B | B | B | B | B |
| Com. Ex. 2 | D | C | D | A | G | G | G | G | G | D | D | D | D | D | C | C | C | C | C |

A: The glossiness is 400 or more.
B: The glossiness is 300 or more, but less than 400.
C: The glossiness is 200 or more, but less than 300.
D: The glossiness is less than 200.

7.3 Wear Resistance

At 48 hours having passed since the production of the printed objects produced using the ink jet composition prepared in each of the Examples and the Comparative Examples, the printed objects were subjected to a wear resistance test using a Sutherland Rub Tester based on JIS K5701. Such a wear resistance test was carried out by using a film made of polyethylene terephthalate ("DIAFOIL G440E" produced by Mitsubishi Plastics Inc.) as an interleaving paper. Thereafter, on the printed objects after the wear resistance test, glossiness thereof was also measured at the measurement angle of 60° in the same manner as described in the above [7.2]. A decreasing ratio of the glossiness before and after the As clearly shown in Table 4, the ultraviolet ray curable ink composition of the invention is excellent in the liquid droplet ejection stability, the storage stability and the curing property. Further, the printed object of the invention exhibits superior gloss and has excellent appearance, and the pattern formation portion also has high wear resistance. In contrast, sufficient results are not obtained in Comparative Examples.

What is claimed is:

1. An ultraviolet ray curable ink composition adapted to be ejected by using an ink jet method, comprising:
    a polymerizable compound;
    an aluminum pigment subjected to a surface treatment with a phosphate compound, the aluminum pigment having particles;
    a substance A having a partial structure represented by the following formula (5):

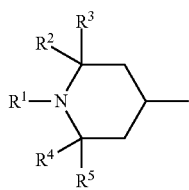

(5)

where in the formula (5), $R^1$ is a hydrogen atom, an oxygen radical, a hydrocarbon group or an alkoxy group, and each of $R^2$, $R^3$, $R^4$ and $R^5$ is independently a hydrogen atom or a hydrocarbon group;

a dispersant having a basic property and a polymer structure, wherein an amine number of the dispersant is in a range of 17 mgKOH/g or more but 80 mgKOH/g or less; and wherein when a waveform separation of an X-ray photoelectron spectrum of the aluminum pigment subjected to the surface treatment with the phosphate compound is performed by using a Voigt function, the X-ray photoelectron spectrum has peaks in the range of 190 eV or more but 192 eV or less.

2. The ultraviolet ray curable ink composition as claimed in claim 1, wherein the phosphate compound has a chemical structure represented by the following formula (1):

$$POR_n(OH)_{3-n} \qquad (1)$$

where in the above formula (1), "R" is $CH_3$ $(CH_2)_m$—, $CH_3(CH_2)_m(CH_2O)_l$—, $CH_3(CH_2)_m(CH_2CH_2O)_l$— or $CH_3(CH_2)_mO$—, "n" is an integral number in the range of 1 or more but 3 or less, "m" is an integral number in the range of 2 or more but 18 or less, and "l" is an integral number in the range of "l" or more but 18 or less.

3. The ultraviolet ray curable ink composition as claimed in claim 1, wherein the phosphate compound has a chemical structure represented by the following formula (2):

$$POR_n(OH)_{3-n} \qquad (2)$$

where in the above formula (2), "R" is $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$ $CF_3(CF_2)_mO$— or $CF_3(CF_2)_m(CH_2)_lO$—, "n" is an integral number in the range of 1 or more but 3 or less, "m" is an integral number in the range of 2 or more but 18 or less, and "l" is an integral number in the range of 1 or more but 18 or less.

4. The ultraviolet ray curable ink composition as claimed in claim 3, wherein the phosphate compound has a perfluoro alkyl structure.

5. The ultraviolet ray curable ink composition as claimed in claim 1, wherein each of the particles of the aluminum pigment is formed into a scaly shape.

6. The ultraviolet ray curable ink composition as claimed in claim 5, wherein an average thickness of the particles of the aluminum pigment is in the range of 10 nm or more but 100 nm or less.

7. The ultraviolet ray curable ink composition as claimed in claim 1, wherein an average particle size in 50% of the particles of the aluminum pigment is in the range of 0.5 μm or more but 3.0 μm or less, and a maximum particle size of the particles of the aluminum pigment is 5.0 μm or less.

8. The ultraviolet ray curable ink composition as claimed in claim 1, wherein the polymerizable compound contains phenoxy ethyl acrylate.

9. The ultraviolet ray curable ink composition as claimed in claim 8, wherein the polymerizable compound contains at least one selected from the group consisting of ethyl 2-(2-hydroxy ethoxy) acrylate, dipropylene glycol diacrylate, tripropylene glycol diacrylate, 2-hydroxy 3-phenoxypropyl acrylate and 4-hydroxy butyl acrylate in addition to the phenoxy ethyl acrylate.

10. The ultraviolet ray curable ink composition as claimed in claim 1, wherein the polymerizable compound contains at least one selected from the group consisting of dimethylol tricyclodecane diacrylate, dimethylol dicyclopentane diacrylate, dicyclopentenyl acrylate, dicyclopentanyl acrylate, isobornyl acrylate, acryloyl morpholine, tetrahydrofurfuryl acrylate, ethylcarbitol acrylate and methoxy triethylene glycol acrylate.

11. The ultraviolet ray curable ink composition as claimed in claim 1, wherein an amount of the substance A is defined as $X_A$ [mass %] and an amount of the aluminum pigment is defined as $X_M$ [mass %], $X_A$ and $X_M$ satisfy a relationship of $0.01 < X_A/X_M < 0.8$.

12. An ultraviolet ray curable ink composition adapted to be ejected by using an ink jet method, comprising:

a polymerizable compound;

an aluminum pigment subjected to a surface treatment with a phosphate compound, the aluminum pigment having particles; and a dispersant having a basic property and a polymer structure, wherein an amine number of the dispersant is in a range of 17 mgKOH/g or more but 80 mgKOH/g or less, wherein the phosphate compound includes a fluorine-based phosphate having a chemical structure represented by the following formula (2):

$$POR_n(OH)_{3-n} \qquad (2)$$

where in the above formula (2), "R" is $CF_3(CF_2)_m$—, $CF_3(CF_2)_m(CH_2)_l$, $CF_3(CF_2)_m(CH_2O)_l$, $CF_3(CF_2)_m(CH_2CH_2O)_l$—, $CF_3(CF_2)_mO$— or $CF_3(CF_2)_m(CH_2)_lO$—, "n" is an integral number in the range of 1 or more but 3 or less, "m" is an integral number in the range of 2 or more but 18 or less, and "l" is an integral number in the range of 1 or more but 18 or less, and wherein when a waveform separation of an X-ray photoelectron spectrum of the aluminum pigment subjected to the surface treatment with the phosphate compound is performed by using a Voigt function, the X-ray photoelectron spectrum has peaks in the range of 190 eV or more but 192 eV or less.

13. An ultraviolet ray curable ink composition adapted to be ejected by using an ink jet method, comprising:

a polymerizable compound;

an aluminum pigment subjected to a surface treatment with a phosphate compound, the aluminum pigment having particles; and a dispersant having a basic property and a polymer structure, wherein an amine number of the dispersant is in a range of 17 mgKOH/g or more but 80 mgKOH/g or less.

* * * * *